(12) United States Patent
Yamaguchi et al.

(10) Patent No.: US 8,428,817 B2
(45) Date of Patent: Apr. 23, 2013

(54) VEHICLE COOLING FAN CONTROL SYSTEM AND VEHICLE COOLING FAN CONTROL METHOD

(75) Inventors: Kazutaka Yamaguchi, Saitama (JP); Satoshi Kondo, Saitama (JP)

(73) Assignee: Calsonic Kansei Corporation, Saitama (JP)

(*) Notice: Subject to any disclaimer, the term of this patent is extended or adjusted under 35 U.S.C. 154(b) by 406 days.

(21) Appl. No.: 12/310,561

(22) PCT Filed: Dec. 13, 2007

(86) PCT No.: PCT/JP2007/073996
§ 371 (c)(1),
(2), (4) Date: Feb. 27, 2009

(87) PCT Pub. No.: WO2008/072683
PCT Pub. Date: Jun. 19, 2008

(65) Prior Publication Data
US 2010/0191416 A1   Jul. 29, 2010

(30) Foreign Application Priority Data
Dec. 15, 2006   (JP) ................................. 2006-338860

(51) Int. Cl.
*B60H 1/32* (2006.01)
*G06F 7/00* (2006.01)

(52) U.S. Cl.
USPC ............. 701/36; 62/228.5; 62/228.1; 62/467; 62/498; 62/450

(58) Field of Classification Search ..................... 701/49, 701/36; 62/228.5, 244, 228.1, 498, 450, 62/467
See application file for complete search history.

(56) References Cited

U.S. PATENT DOCUMENTS

| 4,186,693 | A | * | 2/1980 | Thien et al. | 123/41.12 |
|---|---|---|---|---|---|
| 4,726,325 | A | * | 2/1988 | Itakura | 123/41.1 |
| 4,977,862 | A | * | 12/1990 | Aihara et al. | 123/41.12 |
| 5,483,927 | A | * | 1/1996 | Letang et al. | 123/41.12 |
| 6,073,456 | A | * | 6/2000 | Kawai et al. | 62/133 |
| 6,119,473 | A | | 9/2000 | Kishita et al. | |
| 6,178,928 | B1 | * | 1/2001 | Corriveau | 123/41.12 |

(Continued)

FOREIGN PATENT DOCUMENTS

| DE | 198 31 792 | 1/1999 |
|---|---|---|
| JP | 58-37453 | 3/1983 |

(Continued)

OTHER PUBLICATIONS

International Search Report issued Mar. 11, 2008 in the International (PCT) Application of which the present application is the U.S. National Stage.

*Primary Examiner* — Thomas Black
*Assistant Examiner* — Sara Lewandroski
(74) *Attorney, Agent, or Firm* — Wenderoth, Lind & Ponack, L.L.P.

(57) ABSTRACT

Vehicle cooling fan control system and method which prevent an occupant from hearing peculiar sounds from a cooling fan due to a decrease in rotation speed are provided. The vehicle cooling fan control system according to the present invention is configured not to stop the rotation of a fan motor for a predetermined time even upon satisfaction of an air conditioner stoppage condition as long as a vehicle interior is quiet.

5 Claims, 2 Drawing Sheets

U.S. PATENT DOCUMENTS

| | | | |
|---|---|---|---|
| 6,374,780 B1 * | 4/2002 | Rutyna et al. | 123/41.12 |
| 6,463,891 B2 * | 10/2002 | Algrain et al. | 123/41.12 |
| 6,466,853 B1 * | 10/2002 | Niimi et al. | 701/65 |
| 6,593,717 B2 | 7/2003 | Yoshimura | |
| 6,688,262 B2 * | 2/2004 | Murakami et al. | 123/41.1 |
| 6,955,060 B2 * | 10/2005 | Homan et al. | 62/228.4 |
| 7,775,059 B2 * | 8/2010 | Suzuki | 62/228.5 |
| 2004/0168449 A1 * | 9/2004 | Homan et al. | 62/134 |
| 2005/0257546 A1 * | 11/2005 | Ishishita | 62/236 |
| 2006/0191500 A1 * | 8/2006 | Sugiyama et al. | 123/41.12 |
| 2006/0236708 A1 * | 10/2006 | Mizuno et al. | 62/228.3 |
| 2006/0259219 A1 * | 11/2006 | Wakiyama et al. | 701/36 |

FOREIGN PATENT DOCUMENTS

| | | |
|---|---|---|
| JP | 59-158972 | 10/1984 |
| JP | 10-157451 | 6/1998 |
| JP | 10-226225 | 8/1998 |
| JP | 11-78510 | 3/1999 |
| JP | 2000-257963 | 9/2000 |
| JP | 2002-051588 | 2/2002 |
| JP | 2004044507 A * | 2/2004 |

* cited by examiner

VEHICLE COOLING FAN CONTROL SYSTEM AND VEHICLE COOLING FAN CONTROL METHOD

TECHNICAL ART

The present invention relates to a cooling fan control system for a vehicle, particularly to a control over an external control type cooling fan in the refrigeration cycle of a vehicle air conditioner and a cooling fan control method for a vehicle.

TECHNOLOGICAL BACKGROUND

In the prior art, a vehicle cooling fan control system is known which comprises a cooling fan (hereinafter, occasionally referred to as radiator fan,) to cool down a vehicle motor system as well as a condenser used in the refrigeration cycle of an air conditioner, as disclosed in Japanese Unexamined Patent Application Publication No. 2002-051588, for example.

While a vehicle key switch is turned off or the key switch is turned on but an engine is stopped, the prior art cooling fan in the vehicle cooling fan control system does not need to cool down a radiator. Therefore, it is controlled to operate or stop, or operate at a certain rotation speed to blow air for cooling down a condenser in the refrigeration cycle of the air conditioner. Further, during engine running, the cooling fan is controlled to operate or stop, or operate at a certain rotation speed based on vehicle speed, engine refrigerant temperature, turning-on and off of the air conditioner, and compressor discharge pressure.

Regarding a hybrid electric automobile which has an engine stop function during engine idling, it does not need air blowing to the radiator to cool the engine. When the air conditioner is turned off during the idling, a cooling fan motor is controlled to stop, decreasing the rotation speed.

Also, in case of an internal combustion engine vehicle in low speed driving or stopping at a traffic light, when engine coolant is low in temperature, the cooling fan is controlled under control of the air conditioner refrigeration cycle. As in the hybrid electric automobile, the turning-off of the air conditioner brings the cooling fan motor under the stop control, decreasing the rotation speed thereof.

Decreasing the rotation speed in the course of stopping, the cooling fan becomes resonant with neighboring components and generates peculiar sounds.

The peculiar sounds from the cooling fan may cause a problem of annoying an occupant in a vehicle while a vehicle interior is relatively quiet, such as during idling for a traffic light to change, at stop of engine idling of a hybrid electric automobile, or during a low speed driving due to a traffic jam.

In the hybrid electric automobile, the engine idling stop system achieves reduced gasoline consumption and reduced toxic gas emissions. Owning to its improved interior quietness, there is a problem that the peculiar sounds of the cooling fan are more conspicuous acoustically to an occupant in the hybrid electric automobile than general engine-driven vehicles.

SUMMARY OF THE INVENTION

At least one object of the present invention is to provide vehicle cooling fan control system and method which prevent generation of peculiar sounds from a cooling fan due to a reduced rotation speed even when stopping of an air conditioner while the interior of a vehicle is quiet.

According to the present invention, a vehicle cooling fan control system comprises a control section which controls a fan motor of a cooling fan from outside so as to maintain a cooling performance of a condenser which cools down a refrigerant delivered from a compressor in a refrigeration cycle of an air conditioner; a determining section which determines whether or not an interior of a vehicle is quiet; a decision section which decides whether or not the air conditioner is in operation; and a timer section which starts counting a predetermined time upon satisfaction of a stoppage condition for the air conditioner, when the determining section determines that the interior of the vehicle is quiet and when the decision section decides that the air conditioner is in operation. When the timer section starts counting the predetermined time, the control section allows the fan motor to operate at a predetermined rotation speed until the predetermined time elapses.

In one aspect of the present invention, the vehicle cooling fan control system is configured to further include an evaporator in the refrigeration cycle of the air conditioner; a temperature sensor which detects an outlet temperature of the evaporator; a setting section which sets a target outlet temperature of the evaporator; and a compressor control section which controls a discharge pressure of the compressor so that the outlet temperature of the evaporator detected by the temperature sensor approaches the target temperature set by the setting section, and which cancels a compressor ON request signal for the compressor when the stoppage condition for the air conditioner is satisfied. The control section comprises a fan motor stop preventing section which allows the fan motor to operate when the compressor ON request signal is generated, and which changes a difference between the target temperature and the outlet temperature of the evaporator detected by the temperature sensor to a zero value without canceling the compressor ON request signal until the predetermined time elapses.

In another aspect of the present invention, the vehicle cooling fan control system is configured to further include a timer setting section which is able to set an arbitrary time to be counted by the timer section. The control section comprises a fan motor rotation speed sensor which detects a rotation speed of the fan motor, and a timer setting corrector section which detects the rotation speed of the fan motor in synchronization with a start of counting of the predetermined time, calculates a resonance time from a detected rotation speed of the fan motor and sets a difference between the time set by the timer setting section and the resonance time as the predetermined time to be counted by the timer section, the resonance time being a time taken for the rotation speed of the fan motor to reach a resonant rotation speed.

In another aspect of the present invention, the control section generates the zero value by changing the set target temperature to the outlet temperature of the evaporator detected by the temperature sensor.

According to the present invention, another vehicle cooling fan control system comprises a cooling fan which includes a fan motor and cools down, by an air blow from a rotation of the fan motor, a condenser which cools down a refrigerant delivered from a compressor in a refrigeration cycle of an air conditioner; and a control section which controls the fan motor of the cooling from outside so as to maintain a cooling performance of the condenser. The control section is configured to determine whether or not an interior of a vehicle is quiet, decide whether or not the air conditioner is in operation, start counting a predetermined time upon satisfaction of a stoppage condition for the air conditioner when the determining section determines that the interior of the vehicle is quiet and when the decision section decides that the air conditioner is in operation, and allow the fan motor to operate at a predetermined rotation speed until the predetermined time elapses when the timer section starts counting the predetermined time.

Further, according to the present invention, a vehicle cooling fan control method comprises the steps of determining whether or not an interior of a vehicle is quiet; deciding whether or not an air conditioner is in operation; starting counting a predetermined time upon satisfaction of a stoppage condition for the air conditioner when the interior of the vehicle is determined to be quiet and when the air conditioner is decided to be in operation; and allowing a fan motor of a cooling fan to operate at a predetermined rotation speed until the predetermined time elapses when starting counting the predetermined time. The cooling fan cools down, by an air blow from a rotation of the fan motor, a condenser which cools down a refrigerant delivered from a compressor in a refrigeration cycle of an air conditioner.

Figure 1:
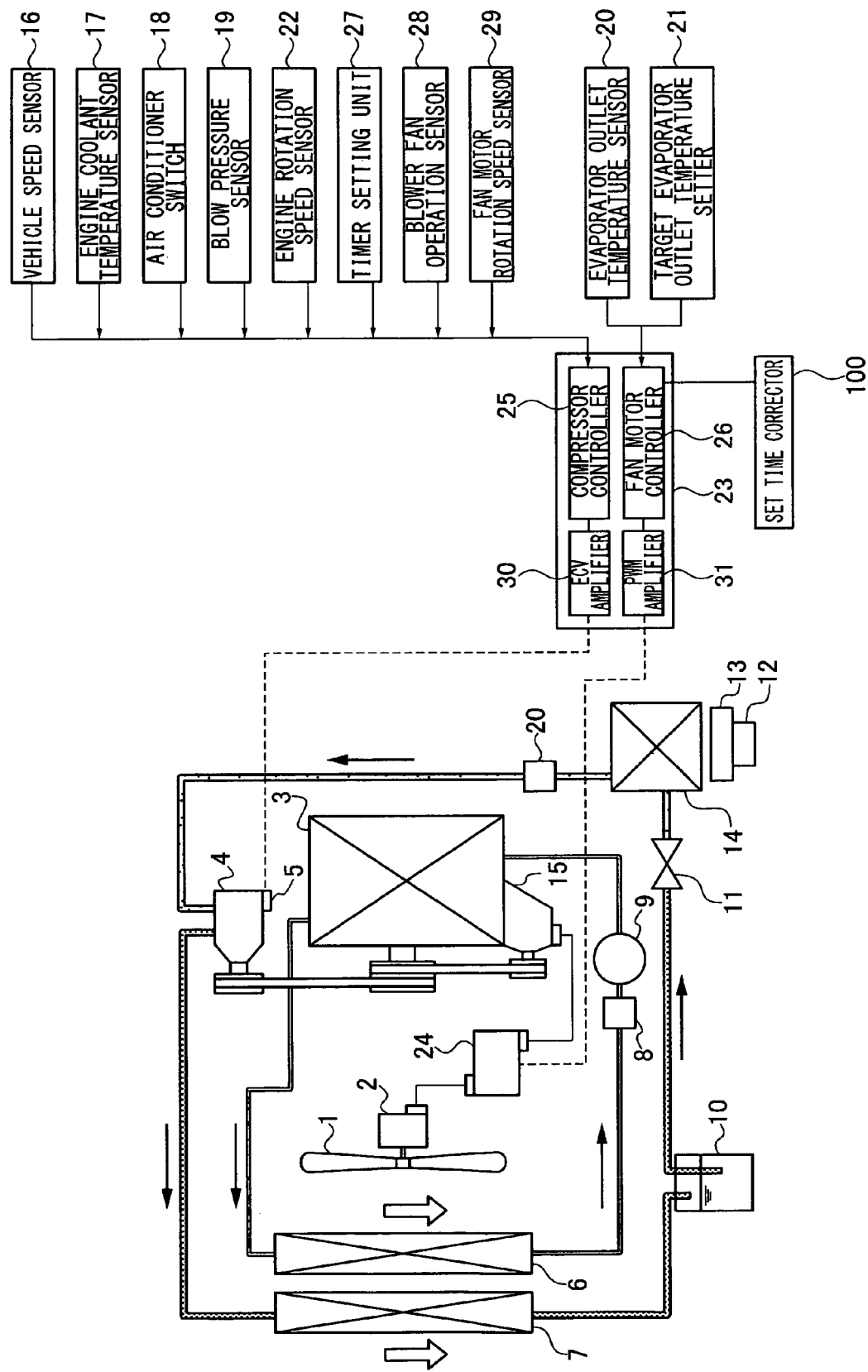
FIG. 1 shows the overall structure of a vehicle cooling fan control system according to the present embodiment.

DESCRIPTION OF THE NUMERAL CODES 1 cooling fan
2 fan motor
4 compressor
14 evaporator
20 evaporator outlet temperature sensor
21 target evaporator outlet temperature setter (target evaporator outlet temperature setting section)
23 control unit (quietness determining section, air conditioner operation decision section, timer section, fan motor stop preventing section, timer setting corrector section)
25 compressor controller (compressor control section)
26 fan motor controller (fan motor control section)
27 timer setting unit (timer setting section)
29 fan motor rotation speed sensor

DETAILED DESCRIPTION OF THE INVENTION

Hereinafter, best modes for carrying out a vehicle cooling fan control system and a method according to the present invention will be described with reference to the accompanying drawings.

First, the structure of a vehicle cooling fan control system according to one embodiment will be described. FIG. 1 shows the overall structure of a cooling unit of an engine (water-cooling type internal combustion engine) and an air conditioner (heating and cooling machine) using the vehicle cooling fan control system according to the present embodiment.

In the cooling unit, an engine 3 and a radiator 6 are connected through an inlet pipe and an outlet pipe for coolant. On a coolant circulation path, a water pump 9 and a thermostat 8 are provided. The water pump 9 circulates the coolant and the thermostat 8 automatically controls a flow of the coolant into the engine according to a coolant temperature. The flow of the coolant is indicated by arrows in FIG. 1.

In a refrigeration cycle of the air conditioner, a compressor 4 of an external control type is driven by the engine 3 or a not-shown motor to compress a vapor refrigerant with low temperature and low pressure from an evaporator 14 into that with high temperature and high pressure and deliver it to a condenser 7.

The condenser 7 is placed in front of the radiator 6 to cool down the vapor refrigerant which is at a high temperature and a high pressure by air from traveling wind or the cooling fan 1, condense it into liquid with high pressure and medium temperature, and deliver the liquid to a liquid tank 10.

The liquid tank 10 removes water and foreign particles from the high-pressure, medium-temperature liquid refrigerant from the condenser 7 to store and smoothly supply it to a thermostatic automatic expansion valve 11.

The thermostatic automatic expansion valve 11 rapidly expands the liquid refrigerant from the liquid tank 10 into a low-temperature, low-pressure misty liquid and delivers it to the evaporator 14.

The evaporator 14 absorbs heat from vehicle room air blown by a blower fan 13 to evaporate the misty refrigerant from the thermostatic automatic expansion valve 11 into a vapor refrigerant with low pressure and low temperature. It delivers the vapor refrigerant to the compressor 4. An evaporator outlet temperature sensor 20 is provided at a position immediately after the outlet of the evaporator 14.

The cooling fan 1 is configured to include a fan motor 2 which operates with a terminal voltage of an alternator 15 driven by the engine 3 or a not-shown battery as a power source. A motor drive voltage for the fan motor 2 is PWM controlled. Operation of the fan motor 2 variably controls the cooling performance of the condenser. PWM refers to pulse width modulation in which a flowing current is adjusted by changing a duty ratio in accordance with an input signal.

Also, the fan motor 2 is configured to receive an ON request signal for the compressor 4. The compressor 4 starts operating in response to the operation of the fan motor 2.

The ON request signal for the compressor 4 is a trigger signal for operating the compressor 4 to supply a minimum discharge pressure. The discharge pressure of the compressor 4 is automatically controlled in accordance with a difference between an evaporator outlet temperature detected by an evaporator outlet temperature sensor 20 and a target evaporator outlet temperature set by a target evaporator outlet temperature setter 21.

With the temperature difference being larger than a predetermined value, the compressor 4 is controlled to supply a larger discharge pressure so that the evaporator outlet temperature can approach the target temperature, while with the temperature difference being smaller than the predetermined value, the compressor 4 is controlled to supply a smaller pressure.

With the temperature difference being zero, the compressor 4 operates at a minimum level.

The blower fan 13 is driven by a blower fan motor 12, absorbs inner air from a vehicle interior and blows it to the evaporator 14 which supplies cooled air to the vehicle interior.

Next, an electronic control system will be described.

A control unit 23 receives various information such as vehicle speed information from a vehicle speed sensor 16, engine coolant temperature information from an engine coolant temperature sensor 17, a switch signal from an air conditioner switch 18, compressor discharge amount information from a discharge pressure sensor 19 provided in an outlet-side pipe of the liquid tank 10, evaporator outlet temperature information from the evaporator outlet temperature sensor 20, target evaporator outlet temperature information from the target evaporator outlet temperature setter 21, an engine rotation speed from a engine rotation speed sensor 22 detecting the engine rotation speed, timer set values from a timer setting unit 27, air volume information on the blower fan from a blower fan air volume sensor 28, and a rotation speed of the fan motor from a fan motor rotation speed sensor 29.

In addition to the above information, the control unit 23 receives necessary information such as inner air sensor information, ambient air sensor information, or solar sensor information.

Further, the timer setting unit 27 sets a time in which the fan motor 2 is forcibly operated when the air conditioner is stopped upon satisfaction of an air conditioner stoppage condition. The time is used to calculate a time to be counted by a timer section (in step S11).

The control unit 23 comprises a fan motor controller 26 which computes a duty ratio output to the fan motor 2, a PWM amplifier 31 which outputs a duty signal to a PWM module 24 in accordance with a computation result of various input information (vehicle speed, engine rotation speed, or else) in the fan motor controller 26, a compressor controller 25 which computes a duty ratio to be output to the compressor 4, and an ECV amplifier 30 which outputs a duty signal to a control valve 5 of the compressor 4 in accordance with a computation result of various input information (evaporator outlet temperature, target evaporator outlet temperature, or else) in the compressor controller 26. The PWM module 24 is connected with the terminal of the alternator 15 and the terminal of a not-shown battery.

Figure 2:
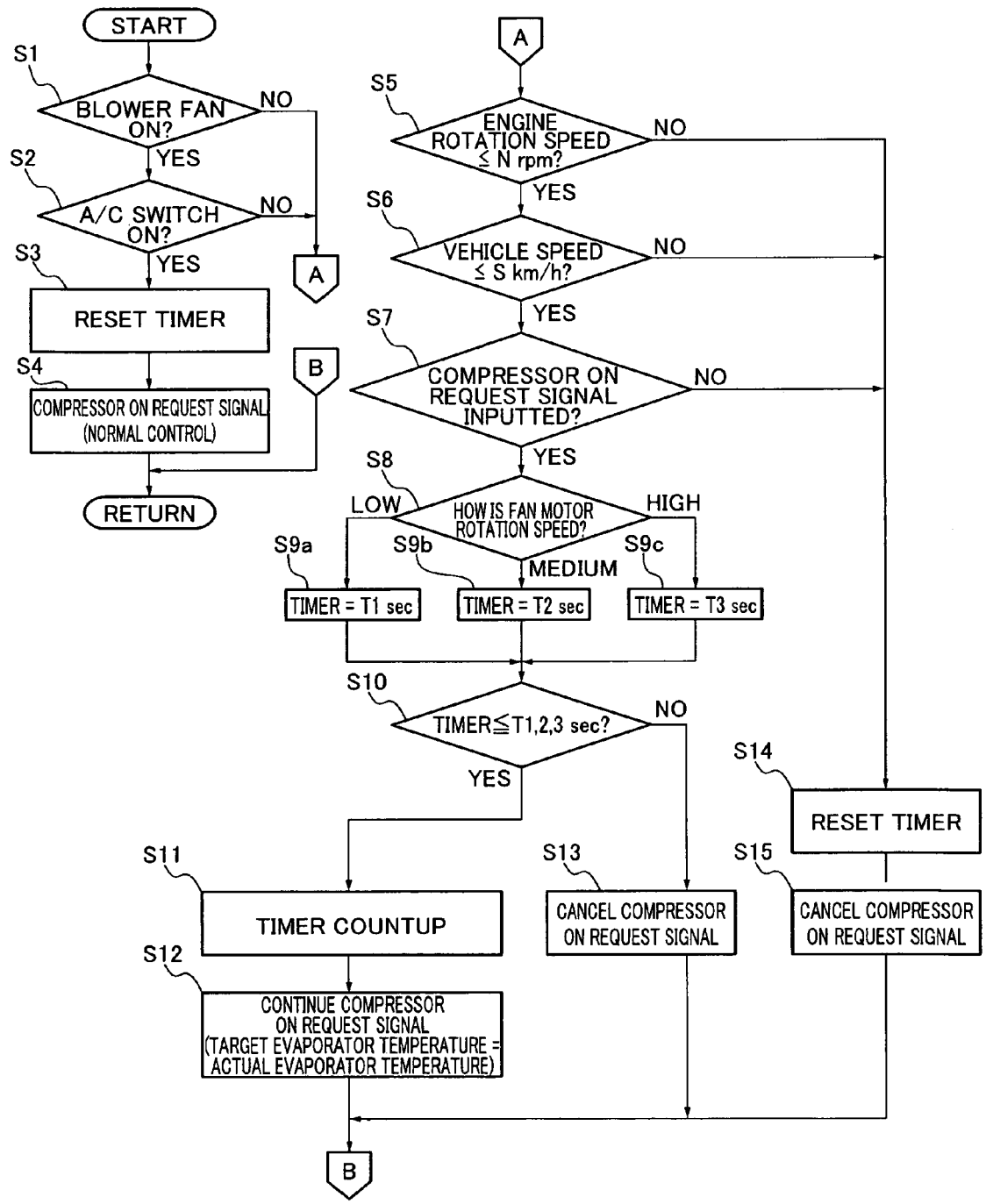
FIG. 2 is a flowchart showing processing of a control unit included in the vehicle cooling fan control system according to the present embodiment.

FIG. 2 is a flowchart describing processing of the control unit 23 of the vehicle cooling fan control system as structured above. Each step will be described in detail in the following.

First, at START, processing starts. In step S1, operation or non-operation of the air conditioner is determined based on air volume information detected by the blower fan air volume sensor 28. The operation of the air conditioner is determined from the operation of the blower fan. Then, the flow proceeds to step S2.

In step S2, the presence or absence of an operation request for the air conditioner is determined according to an on or off-state of the air conditioner switch. Upon confirmation of the operation request for the air conditioner, the flow proceeds to step S3.

In step S3, a count time of a later-described timer is reset, and the flow proceeds to step S4.

In step S4, since the air conditioner switch is turned on, the compressor ON request signal is output to maintain the operation of the compressor 4 in the air conditioner refrigeration cycle.

Here, the fan motor 2 is operated concurrently with the compressor 4 to externally, variably control the cooling performance of the condenser 7 in the air conditioner refrigeration cycle.

Meanwhile, the air conditioner is determined to not be in operation when the control unit 23 does not receive a signal output which is based on operation, rotation speed, or air volume of the blower fan detected by the blower fan operation sensor 28 in step S1 or a signal output which is based on the on-state of the air conditioner switch in step S2. Then, processing in step S5 and the following steps is started.

In step S5, a determination is made on whether or not the rotation speed of the engine 3 detected by the engine rotation speed sensor 22 is equal to or less than a predetermined rotation speed. In the present embodiment, the predetermined rotation speed is set to 2,000 rpm, but it is not limited thereto.

This engine rotation speed can be set appropriately, referring to a state of quietness in which an occupant does not recognize resonant sounds from the rotation of the cooling fan 1 when the sounds occur, or in which an occupant does recognize the resonant sounds but is not annoyed by them, or the like. With the detected engine rotation speed being below the predetermined rotation speed, the flow proceeds to step S6.

In step S6, a determination is made on whether or not the vehicle speed detected by the vehicle speed sensor 16 is equal to or less than a predetermined vehicle speed. In the present embodiment, the predetermined vehicle speed is set to 20 km/h, but it is not limited thereto.

The predetermined vehicle speed is appropriately set, referring to a state of quietness in which an occupant does not recognize resonant sounds from the rotation of the cooling fan 1 when the sounds occur, or in which an occupant does recognize the resonant sounds but is not annoyed by them, or the like. With the detected vehicle speed being below the predetermined vehicle speed, the flow proceeds to step S7.

In step S7, the presence or absence of the ON request signal for the compressor 4 is determined. In the prior art system, when the air conditioner switch is switched from ON to OFF, the ON request signal is canceled (stop of the compressor 4). The vehicle cooling fan system according to the present embodiment is configured to determine whether or not the ON request signal for the compressor 4 (stop processing for the compressor 4) is canceled after a later-described processing, even when the air conditioner switch is turned off or the blower fan 13 is stopped, satisfying the air conditioner stoppage condition.

In step S8, a current rotation speed of the fan motor detected by the fan motor rotation speed sensor 29 is checked. Three levels of the rotation speed are preset, and the current rotation speed is classified into one of the 3 levels.

Here, the rotation speed of the fan motor 2 operating by the compressor ON request signal is associated with a period of time (hereinafter, resonance time) from the stop of the fan motor 2 due to the cancellation of the compressor ON request signal to the rotation speed thereof decreasing to a value in a resonant area. The resonance time is used in correcting a later-described set time and generation of a time counted by the timer. Note that the number of levels of the rotation speed of the fan motor can be set arbitrarily.

In step S9, a time for continuing processing in later-described step S12 is set (hereinafter, set time). A set time corrector 100 of the fan motor controller 26 calculates the set time by subtracting the calculated resonance time according to the levels of the rotation speed of the fan motor 2 in step S8 from a time set by an external timer setting unit 27. A timer section (step S11) stores the set time (steps S9a, S9b, S9c) to count.

In the vehicle cooling fan control system according to the present embodiment, 3 levels of the set time, 120 sec., 140 sec., 160 sec. are generated according to the rotation speed of the fan motor 2 (steps S9a, S9b, S9c), for example.

The set time is set to 120 sec. at shortest with a signal waiting time taken into consideration, but it is not limited thereto. The set time is shorter than the time to count by the resonance time, and the resonance time increases as the rotation speed of the cooling fan increases.

In step S10, when the later-described timer section (step S11) has not completed counting the set time in step S9, the flow proceeds to step S11.

In step S11, a counter of the timer unit counts an elapsed time from a count start time to a present time. The flow proceeds to step S12.

In step S12, although the air conditioner stoppage condition is satisfied (step S1 or S2), the compressor request signal is not canceled until the set time elapses. Further, the fan motor controller 26 changes the temperature set by the target evaporator outlet temperature setter 21 to the evaporator outlet temperature detected by the evaporator outlet temperature sensor 20. In other words, the fan motor controller 26 changes a difference between the target outlet temperature and the detected outlet temperature to zero.

Accordingly, in step S12 the compressor ON request signal is canceled and the discharge pressure of the compressor S4 is zero so that the compressor is substantially in non-operation or operated at a minimum level.

The difference, zero value, is generated by changing the target evaporator outlet temperature to the detected evaporator outlet temperature in the fan motor controller 26.

While the fan motor control unit 26 is outputting the compressor ON request signal to the fan motor 2, the fan motor 2 is continuously operated.

When the timer counts a time over the set time in the step S10, the flow proceeds to step S13. After the lapse of the set time, a normal control is started, canceling the compressor ON request signal to stop the compressor 4 and the fan motor 2.

Further, with the detected rotation speed of the engine exceeding the predetermined rotation speed in the step S5, or with the detected vehicle speed exceeding the predetermined vehicle speed in the step S6, that is, upon satisfaction of a specified condition for non-quietness of the vehicle interior, the flow proceeds to step S14 to reset the count of the timer, then proceeds to step S15. The ON request signal for the compressor 4 is cancelled to stop the compressor 4 and thereby stop the fan motor 2.

In this flowchart, steps S5, S6 correspond to a quietness condition determining section, step S7 corresponds to an air conditioner operation decision section, step S8 corresponds to a fan motor rotation speed sensor, steps S11, S3, S14 correspond to a timer section, and step S12 corresponds to a fan motor stop preventing section.

Next, effects of the vehicle cooling fan control system and method according to the present embodiment will be described.

The vehicle cooling fan control system according to the present embodiment is configured that upon satisfaction of the air conditioner stoppage condition, first, the quietness condition determining section (steps S5, S6) determines whether or not the quietness condition is satisfied.

Then, with the quietness condition being satisfied, the air conditioner operation decision section (step S7) decides whether or not the air conditioner is in operation. When the air conditioner is decided to be in operation, the timer section (step S11) starts counting the predetermined time. Until the predetermined time elapses, the fan motor controller 26 allows the fan motor 2 to continuously operate at the predetermined rotation speed.

Consequently, even with the stop of the air conditioner, the operation of the cooling fan 1 is maintained during the predetermined time when the vehicle interior is quiet. Accordingly, the present embodiment achieves the vehicle cooling fan control system which prevents an occupant from hearing the particular sounds.

Further, the fan motor 2 is configured to continuously operate while the compressor ON request signal is generated. The compressor 4 is operated by the compressor ON request signal, and the evaporator outlet temperature is controlled to approach the target evaporator outlet temperature.

Upon the satisfaction of the air conditioner stoppage condition, that is, the turning-off of the air conditioner switch, for example, counting of the set time starts. Until the set time elapses, the target outlet temperature of the evaporator 14 is controlled to match the actual outlet temperature without cancellation of the compressor ON request signal.

Accordingly, even with the satisfaction of the air conditioner stoppage condition, the compressor 4 stops or operates at a minimum level, and the fan motor 2 continues to operate at the predetermined rotation speed.

As a result, it is made possible to realize a vehicle cooling fan control system which shows good power efficiency since the compressor stops or operates at the minimum level with the satisfaction of the air conditioner stoppage condition as well as prevents an occupant from hearing the particular sounds from the cooling fan 1.

Moreover, the set time corrector 100 is configured to calculate the resonance time in which the rotation speed of the fan motor 2 reaches the resonant rotation speed after the start of the counting, subtract the resonance time from the time set by the timer setting unit 27, and change the set time counted by the timer section (step S11) to the resultant value.

In other words, the cooling fan 1 can be stopped earlier than the time set by the timer setting unit 27 with the time for the fan motor to reach the resonant rotation speed due to inertia after the stop of the cooling fan taken into consideration. Accordingly, it is possible to provide a vehicle cooling fan control system which achieves power saving and does not generate peculiar sounds.

Further, the embodiment of the present invention makes it possible to easily realize a vehicle cooling fan control system with excellent power efficiency and quietness using the existing vehicle cooling fan control system by manipulating the information for controlling the compressor 4 to stop or operate at the minimum level, and to maintain the rotation speed of the cooling fan 1.

In the above, although the present invention has been described in terms of exemplary embodiments, it is not limited thereto. It should be appreciated that variations and additions may be made in the described embodiments by persons skilled in the art without departing from the scope of the present invention as defined by the following claims. For example, in the present embodiment, the elapsed time of the timer section is classified into three levels in steps S9a to S9c, but it is not limited thereto. The number of levels can be one or four or more.

Moreover, in the present embodiment, at the start of counting the set time upon the satisfaction of the air conditioner stoppage condition, the fan motor is configured to maintain the rotation speed from the start of the counting. However, the rotation speed can be decreased to be very close to the resonant rotation speed. In this case, power efficiency of the system can be improved.

From the embodiment of the present invention, the following configurations of the invention can be obtained.

(1) A vehicle cooling fan control system is configured to include a control section which controls a fan motor of a cooling fan from outside so as to maintain a cooling performance of a condenser which cools down a refrigerant delivered from a compressor in a refrigeration cycle of an air conditioner; a determining section which determines whether or not an interior of a vehicle is quiet; a decision section which decides whether or not the air conditioner is in operation; and a timer section which starts counting a predetermined time upon satisfaction of a stoppage condition for the air conditioner when the determining section determines that the interior of the vehicle is quiet and when the decision section decides that the air conditioner is in operation, in which when the timer section starts counting the predetermined time, the control section allows the fan motor to operate at a predetermined rotation speed until the predetermined time elapses.

The prior art cooling fan motor is controlled to maintain the cooling performance of the condenser which cools down the refrigerant from the compressor. Because of this, once the air conditioner is stopped, the compressor and condenser are also stopped to stop the cooling fan unless a request for cooling the radiator is issued.

According to the present invention in the item (1), when the stoppage condition for the air conditioner is satisfied, first, the quietness condition determining section determines whether or not quietness condition is satisfied. The quietness condition is set based on information such as running speed or engine rotation speed.

Then, upon satisfaction of the quietness condition, the air conditioner operation decision section decides whether or not the air conditioner is in operation. When the air conditioner is decided to be in operation, the timer section starts counting the predetermined time. And, until the predetermined time elapses, the fan motor control section allows the fan motor to continue to operate at the predetermined rotation speed.

For example, the predetermined rotation speed of the fan motor can be a constant rotation speed inherent to the fan motor when it is set invariable, while when it is set variable, it can be such a rotation speed as not to cause resonance with a fact that resonance occurs in low rotation speed range of the cooling fan taken into consideration.

According to the invention in the item (1), it is thus possible to realize a vehicle cooling fan control system and method which can maintain, even with the stop of the air conditioner, the operation of the cooling fan for a predetermined period of time while the vehicle interior is quiet, to thereby prevent an occupant from hearing the peculiar sounds.

(2) The vehicle cooling fan control system according to the item (1) is configured to further include an evaporator in the refrigeration cycle of the air conditioner; a temperature sensor which detects an outlet temperature of the evaporator; a setting section which sets a target outlet temperature of the evaporator; and a compressor control section which controls a discharge pressure of the compressor so that the outlet temperature of the evaporator detected by the temperature sensor approaches the target temperature set by the setting section, and which cancels a compressor ON request signal for the compressor when the stoppage condition for the air conditioner is satisfied, in which the control section comprises a fan motor stop preventing section which allows the fan motor to operate when the compressor ON request signal is generated, and which changes a difference between the target temperature and the outlet temperature of the evaporator detected by the temperature sensor to a zero value without canceling the compressor ON request signal until the predetermined time elapses.

The invention according to the item (2) is configured such that in the invention according to the item (1), the operation of the fan motor is continued while the compressor ON request signal is generated. Also, the compressor is set to be operated by the compressor ON request signal and the evaporator outlet temperature is controlled to approach the target evaporator outlet temperature.

Then, upon satisfaction of the stoppage condition for the air conditioner such as turning-off of the air conditioner switch, the counting of the predetermined time is started. The target outlet temperature of the evaporator is controlled to match the actual outlet temperature without cancellation of the compressor ON request signal until the predetermined time elapses.

Thus, even upon the satisfaction of the air conditioner stoppage condition, the compressor can stop or operate at a minimum level and the fan motor can be continuously operated at the predetermined rotation speed.

According to the invention in the item (2), it is thus possible to realize vehicle cooling fan control system and method which allows the compressor to stop or operate at a minimum level and achieves a good power efficiency and which can prevent an occupant from hearing the peculiar sounds.

(3) The vehicle cooling fan control system according to the item (1) or (2) is configured to further include a timer setting section which sets an arbitrary time to be counted by the timer section, in which the control section comprises a fan motor rotation speed sensor which detects a rotation speed of the fan motor, and a timer setting corrector section which detects the rotation speed of the fan motor in synchronization with a start of counting of the predetermined time, calculates a resonance time from a detected rotation speed of the fan motor and sets a difference between the time set by the timer setting section and the resonance time as the predetermined time to be counted by the timer section, the resonance time being a time taken for the rotation speed of the fan motor to reach a resonant rotation speed.

The invention in the item (3) is configured that in the invention in the item (1) or (2), the timer setting corrector section calculates the resonance time in which the rotation speed of the fan motor reaches the resonant rotation speed after start of the counting, and subtracts the resonance time from the time set by the timer setting section to change the predetermined time to be counted by the timer section to the resultant value.

That is, the cooling fan can be stopped earlier than the time set by the timer setting section with the time for the fan motor to reach the resonant rotation speed due to inertia after the stop of the cooling fan taken into consideration, so that it is possible to realize a vehicle cooling fan control system and method which can achieve power saving and prevent an occupant from hearing the peculiar sounds.

(4) In the vehicle cooling fan control system according to the item (2) or (3), the control section is configured to generate the zero value by changing the set target temperature to the outlet temperature of the evaporator detected by the temperature sensor.

According to the invention in the item (4), it is possible to easily realize a vehicle cooling fan control system which achieves excellent power efficiency and quietness using the existing vehicle cooling fan control system in the invention in the item (2) or (3) by manipulating the information for controlling the compressor to stop or operate at the minimum level, and to maintain the rotation speed of the cooling fan.

(5) A vehicle cooling fan control system is configured to include a cooling fan which includes a fan motor and cools down, by an air blowing from a rotation of the fan motor, a condenser which cools down a refrigerant delivered from a compressor in a refrigeration cycle of an air conditioner; and a control section which controls the fan motor of the cooling from outside so as to maintain a cooling performance of the condenser, in which the control section is configured to determine whether or not an interior of a vehicle is quiet, decide whether or not the air conditioner is in operation, start counting a predetermined time upon satisfaction of a stoppage condition for the air conditioner when the determining section determines that the interior of the vehicle is quiet and when the decision section decides that the air conditioner is in operation, and allow the fan motor to operate at a predetermined rotation speed until the predetermined time elapses when the timer section starts counting the predetermined time.

The invention in the item (5) achieves the same effects as the invention in the item (1). Further, the invention according to any one of the items (2) to (4) is applicable to the invention in the item (5) to achieve the same effects as those of the items (2) to (4).

(6) A vehicle cooling fan control method is configured to include the steps of determining whether or not an interior of a vehicle is quiet; deciding whether or not an air conditioner is in operation; starting counting a predetermined time upon satisfaction of a stoppage condition for the air conditioner, when the interior of the vehicle is determined to be quiet and when the air conditioner is decided to be in operation; and allowing a fan motor of a cooling fan to operate at a predetermined rotation speed until the predetermined time elapses when counting of the predetermined time is started, the cooling fan cooling down, by an air blowing from a rotation of the fan motor, a condenser which cools down a refrigerant delivered from a compressor used in a refrigeration cycle of an air conditioner.

The invention according to the item (6) achieves the same effects as the invention in the item (1). Further, the invention according to any one of the items (2) to (4) is applicable to the invention in the item (6) to achieve the same effects as those of the items (2) to (4).

Although the present invention has been described in terms of exemplary embodiments, it is not limited thereto. It should be appreciated that variations may be made in the embodiments described by persons skilled in the art without departing from the scope of the present invention as defined by the following claims.

The present application is based on and claims priority from Japanese Patent Application No. 2006-338860, filed on Dec. 15, 2006, the disclosure of which is hereby incorporated by reference in its entirety.

The invention claimed is:

1. A vehicle cooling fan control system, comprising:
a cooling fan including a fan motor and configured to cool a condenser by an air blowing from a rotation of said fan motor, said condenser being configured for cooling down a refrigerant delivered from a compressor in a refrigeration cycle of an air conditioner;
an evaporator in a refrigeration cycle of the air conditioner;
a temperature sensor for detecting an actual outlet temperature of said evaporator;
a setting section for setting a target outlet temperature of said evaporator; a compressor control section for controlling a discharge pressure of said compressor via a compressor ON request signal so that the actual outlet temperature of said evaporator as detected by said temperature sensor approaches the target outlet temperature set by said setting section; and
a fan motor control section for receiving the compressor ON request signal from the compressor control section to control said fan motor of said cooling fan so as to maintain a cooling performance of said condenser, said fan motor control section being configured to:
determine whether or not at least one of a vehicle speed and an engine rotation speed is lower than a predetermined speed;
decide whether or not the air conditioner is in operation;
start counting a predetermined time upon satisfaction of a stoppage condition for the air conditioner and upon determining that at least one of the vehicle speed and the engine rotation speed is lower than the predetermined speed;
control said fan motor to keep operating at a predetermined rotation speed while receiving the compressor ON request signal even when the stoppage condition is satisfied, and to stop operating when the predetermined time has elapsed; and
when the stoppage condition is satisfied, change a difference between the set target outlet temperature and the actual outlet temperature of said evaporator detected by said temperature sensor to a zero value without canceling the compressor ON request signal so as to make the compressor stop or operate at a minimal level.

2. The vehicle cooling fan control system according to claim 1, further comprising a timer setting section configured to set a length of time to be counted as the predetermined time, wherein said fan motor control section further includes:
a fan motor rotation speed sensor for detecting the rotation speed of said fan motor; and
a timer setting corrector section for detecting a rotation speed of said fan motor in synchronization with the start of counting of the predetermined time, calculating a resonance time from a detected rotation speed of said fan motor, and setting a difference between the time set by said timer setting section and a resonance time as the predetermined time to be counted, the resonance time being a time taken for the rotation speed of the fan motor to reach a resonant rotation speed.

3. The vehicle cooling fan control system according to claim 1, wherein the stoppage condition for the air conditioner is satisfied by placing the air conditioner switch in the OFF position.

4. A vehicle cooling fan control method, comprising:
determining whether or not at least one of a vehicle speed and an engine rotation speed is lower than a predetermined speed;
deciding whether or not an air conditioner is in operation;
starting counting of a predetermined time upon satisfaction of a stoppage condition for the air conditioner and upon determining that at least one of the vehicle speed and the engine rotation speed is lower than the predetermined speed;
detecting an outlet temperature of an evaporator in a refrigeration cycle of the air conditioner;
setting a target outlet temperature of the evaporator;
controlling a discharge pressure of a compressor via a compressor ON request signal so that the detected outlet temperature of the evaporator approaches the set target outlet temperature;
controlling a fan motor of a cooling fan to keep operating at a predetermined rotation speed while receiving the compressor ON request signal even when the stoppage condition is satisfied, and to stop operating when the predetermined time has elapsed; and
when the stoppage condition for the air conditioner is satisfied, changing a difference between the target outlet temperature and the detected outlet temperature of the evaporator to a zero value without cancelling the compressor ON request signal so as to make the compressor stop or operate at a minimal level.

5. The vehicle cooling fan control method according to claim 4, wherein the stoppage condition for the air conditioner is satisfied by placing the air conditioner switch in the OFF position.

* * * * *